United States Patent [19]

Skurski

[11] 4,440,480
[45] Apr. 3, 1984

[54] FILM SAVING APPARATUS FOR PHOTOGRAPHIC CAMERA

[76] Inventor: James K. Skurski, 5591 Clinchfield Trail, Norcross, Ga. 30092

[21] Appl. No.: 401,878

[22] Filed: Jul. 26, 1982

[51] Int. Cl.³ .............................................. G03B 35/10
[52] U.S. Cl. ..................................... 354/110; 354/212
[58] Field of Search .............. 354/202, 203, 212, 213, 354/214, 215, 216, 288, 112, 113, 114, 115, 110

[56] References Cited

U.S. PATENT DOCUMENTS

| 3,377,935 | 4/1968 | Furusawa | 354/212 |
| 3,465,657 | 9/1969 | Welzel et al. | 354/212 |
| 3,479,938 | 11/1969 | Winkler et al. | 354/212 |
| 3,481,260 | 12/1969 | Ettischer et al. | 354/212 |
| 3,567,147 | 3/1971 | Engelsmann | 354/212 |
| 3,895,867 | 7/1975 | Lo et al. | 354/115 |
| 4,037,950 | 7/1977 | Lo et al. | 354/115 |
| 4,274,726 | 6/1981 | Yoneyama et al. | 354/212 |
| 4,397,535 | 8/1983 | Harvey | 354/212 |

*Primary Examiner*—A. A. Mathews

[57] ABSTRACT

A film saving apparatus for photographic camera in which a spring loaded stop member projects into the film path when the rear door of the camera is swung open. The stop member is positioned to engage a notched portion of the leader end of a conventional roll of 35 mm film after the tongue portion is received onto the take-up spool. The stop member is retracted when the camera door is closed by virtue of a camming action exerted by the door member on the stop member overcoming the action of the spring. The 35 mm film now passes over the stop member which is retracted out of the film path.

8 Claims, 6 Drawing Figures

FILM SAVING APPARATUS FOR PHOTOGRAPHIC CAMERA

BACKGROUND OF THE INVENTION

This invention relates to a film saving apparatus for a photographic camera, especially in the type of camera for producing 3-dimensional prints on lenticular material.

In producing a 3-dimensional print on a lenticular print film, a series of photographs are taken of a subject field from different angles of view by a multilens camera as described, for example, in U.S. Pat. Nos. 3,895,867 and 4,037,950 to Lo et al. The negatives in the series are printed on film covered with a lenticular screen to form lineiform images of the subject. A camera of the type described in the patents takes a series of photographs at laterally spaced vantage points to record a series of exposures, for example, at least four negatives that constitute a group for producing one 3-dimensional print. A problem associated in the taking of the series of negatives is that if one negative or a portion of the negative is incomplete, the entire group is unsuitable in the production of a 3-dimensional print. To this end it is essential that the photographic film not be wasted by winding more than is necessary onto the take-up roll. Frequently, due to habit or otherwise, the operator of the camera may unintentionally wind more film onto the take-up spool as the camera is being loaded thereby loosing one or more prints due to film wastage.

In accordance with the present invention, a film saving apparatus is used in conjunction with the camera for preventing the waste of photographic film and insuring that maximum film is available for producing as many prints as is possible from a single roll of film. The invention has application to any camera using conventional 35 mm roll film or any other roll film because it enables maximum use of the roll film in producing prints. Thus the inventive apparatus by saving film enables the operator of the camera to take as many pictures as possible from a single roll of film and is significant improvement over existing photographic cameras from this standpoint alone.

In the past there have been various devices for threading film onto a take-up spool in a camera by guiding the leader of the roll film to effectuate easy loading and advancement of the film along its film path. For example, U.S. Pat. No. 3,481,260 to Ettischer et al discloses a camera wherein the improvement comprises auxiliary winding means for operatively interconnecting the covered door and the take-up spool for rotating the take-up spool to wind film thereon when the covered door is moved from its open position to its closed position. U.S. Pat. No. 3,377,935 to Furusawa discloses a take-up spool with projecting pawls adapted to intersect the path of the film path as the film is being inserted into the camera with the pawls engaging perforations on the film to effectuate automatic loading of the camera. U.S. Pat. No. 3,479,938 to Winkler et al discloses a camera with automatic film threading mechanism including a deflector which is spring-loaded to be properly positioned with regard to the leading edge of the film being inserted into the camera. U.S. Pat. No. 3,567,147 to Engelsmann et al discloses a camera wherein the inlet of the take-up chamber is adjacent to the discharge end of the film channel and there is a narrow gap for automatically directing the leader of the film toward, and through, the inlet of the take-up chamber. U.S. Pat. No. 3,465,657 to Welzel et al discloses a take-up spool for a camera that automatically guides the film onto the take-up spool. U.S. Pat. No. 4,274,726 to Yoneyama et al discloses automatic film winder including a pressing chamber for guiding the film in the proper manner to effectuate easy loading and accurate advancement thereof. None of these patents contemplates saving film as envisioned by the instant invention.

SUMMARY OF THE INVENTION

The present invention comprises a film saving apparatus for maximizing the number of exposures on photographic film in a camera. The film saving apparatus is particularly significant in photographic cameras producing autostereoscopic pictures or three-dimensional prints on lenticular print film. For these pictures multiple exposures or a series of photographs are taken of the subject field from differing angles of view. The negatives in the series are printed on film covered with a lenticular screen to form lineiform images of the subject. As a result if one negative is missing, the print will be defective.

The film saving apparatus utilizes a stop member that is moveable into and out of the film path to block the advance of film after the tongue portion of the leader is threaded onto the take-up roll. The stop member is positioned at right angles to the film path but does not extend completely across the film path and, therefore, does not block the advance of the relatively narrow tongue portion of the film leader as it is being wound onto the take up spool. However, when the film advances to the full film width, the stop member blocks the advance of the film onto the take-up roll. The stop member is moveable into and out of the film path and is connected to a lever member that is pivotably mounted on the housing of the camera. A spring member in the housing is wound on an axis which is preferably the same axis as the pivot axis of the lever member. The spring member normally urges the lever member in a direction which positions the stop member into the path of the film. The rear door of the camera is preferably pivoted on the same axis in the housing as the lever member. The rear door is formed with a camming surface for camming the lever member to overcome the action of the spring member upon closing the door, thereby retracting the stop member into a position out of the film path. When the door is closed, the film is then ready to be advanced for picture taking with the maximum film available for use in the taking of the pictures thereby saving film from being wasted. In the case of an autostereoscopic or three-dimensional picture which takes a series of negative exposures to produce one print, the saving of the film for a single exposure can result in the production of at least one more print. Therefore, it is not only the conserving of the film that is an advantage in the instant invention but also the capability of producing additional prints which would otherwise not be available.

It is therefore a principal object of the present invention to improve photographic cameras.

It is another object of the present invention to improve cameras for taking autostereoscopic or three-dimensional pictures.

It is still another object of the present invention to enable saving film to maximize the number of exposures taken by a photographic camera.

It is still a further object of the invention to produce film saving apparatus in a simple and inexpensive manner.

DETAILED DESCRIPTION OF PREFERRED EMBODIMENTS

Figure 1:
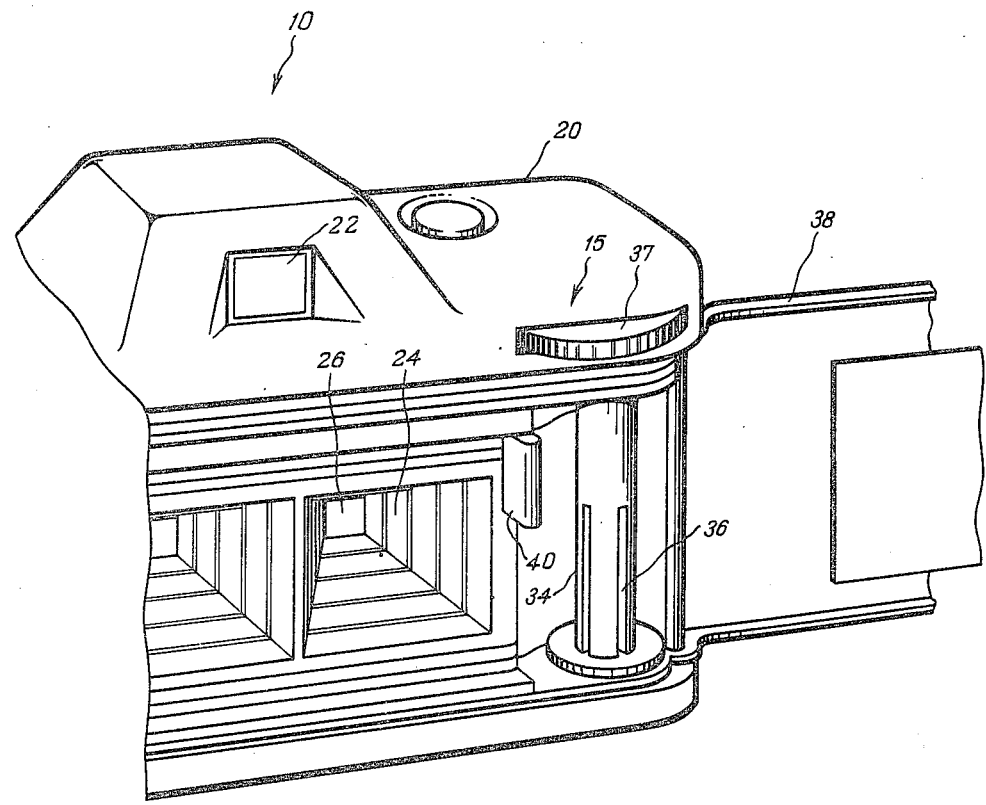
FIG. 1 is a partial perspective view of a camera incorporating film saving apparatus according to the present invention.
Figure 2:
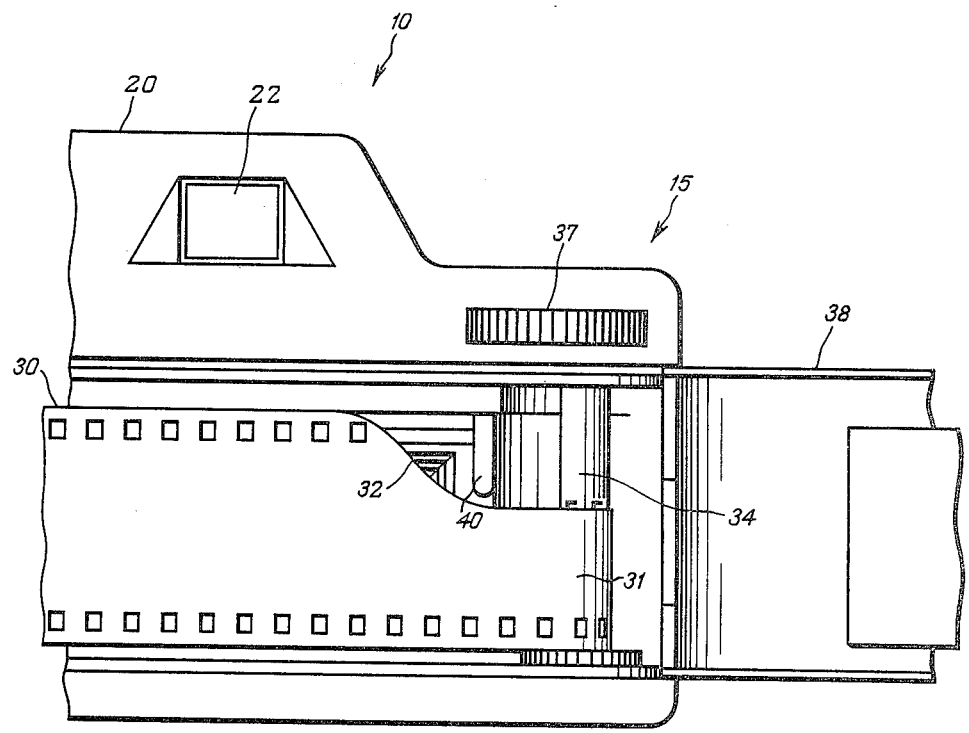
FIG. 2 is a partial rear view of the camera shown in FIG. 1.
Figure 3:
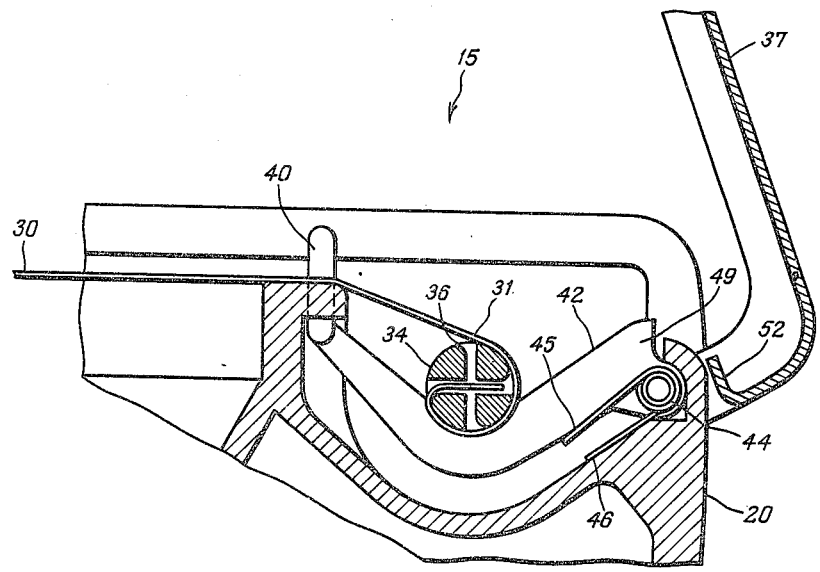
FIGS. 3 and 4 are partial side sectional views of the camera with the back door in the open and closed positions, respectively.
Figure 4:
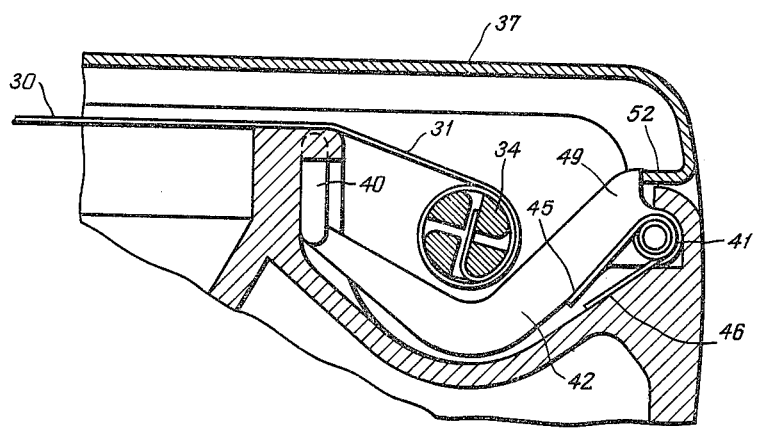

Referring now to FIGS. 1 and 2, a camera 10 capable of taking 3-dimensional pictures as described for example, in U.S. Pat. No. 4,037,950 to Lo et al and commonly assigned herewith, is shown including a film saving apparatus generally designated 15. Camera 10 includes a housing 20 having a view finder 22 and chambers 24 behind lens shutter combinations 26 for exposing unexposed film 30.

The film 30 typically is 35 mm roll film having a tongue portion 31 at the leader end that has a relatively narrow width approximately one-half that of the film width extending from a notched portion 32 on the film. Normally the tongue portion 31 does not exceed 23 mm in width.

Tongue portion 31 extends for a predetermined length sufficient for the film to be properly loaded into the camera by winding the tongue portion around a take-up spool 34. Spool 34 has slots 36 formed therein for receiving the lead end of the tongue portion 31. Take up spool 34 is rotated in any suitable manner as by a thumb wheel 37 to advance the tongue portion and subsequently the remainder of the film onto the take-up spool.

In accordance with the present invention film saving apparatus 15 stops the film 30 from being advanced onto the take-up spool 34 after the tongue portion 31 is wound onto the take-up spool. To this end the film stop apparatus includes a stop member 40 that is moveable into and out of the film path to permit the tongue portion to pass but to block the film at notched portion 32 so that the film cannot be further advanced onto the take-up spool when loading the film into the camera. After loading the film into the camera and closing back door 38, the stop member is withdrawn out of the film path so that the film can be advanced onto the take-up spool for picture taking as will become more apparent. Stop member 40 is connected to a lever member 42 which is pivotally mounted on an axis 41 in the housing 20. A torsion spring 44 is wound in housing 20 preferably on axis 41. Spring 44 has end portions 45, 46 that extend in surface contact with lever member 42 and housing 20, respectively. As a result the stop member 40 is normally urged into a position in the film path to prevent advance of the film 30 onto the take-up spool after tongue portion 31 is received on the take-up spool.

Back-door member 38 is pivotably mounted on the housing 20 preferably on axis 41. Door member is formed with a camming surface 52. Upon moving the door member 38 into a closed position camming surface 52 engages a shoulder portion 49 of lever member 42 urging the lever member 42 and stop member 40 in a direction out of the film path while overcoming the action of torsion spring 44. Any suitable spring can be used in place of torsion spring 44. It will now be appreciated that when the film has been loaded into the camera and the tongue portion of the film advanced onto the take-up spool that upon closing the rear door member the film can now be advanced for picture taking. Film will not be wasted enabling as many pictures as possible to be taken and guarding against the loss of one or more pictures in cameras that take autostereoscopic or three-dimensional pictures. Thus it is possible according to the present invention to prevent wasting film and maximize the number of exposures that can be made on a roll of film in a manner which is simple and relatively inexpensive.

Figure 5:
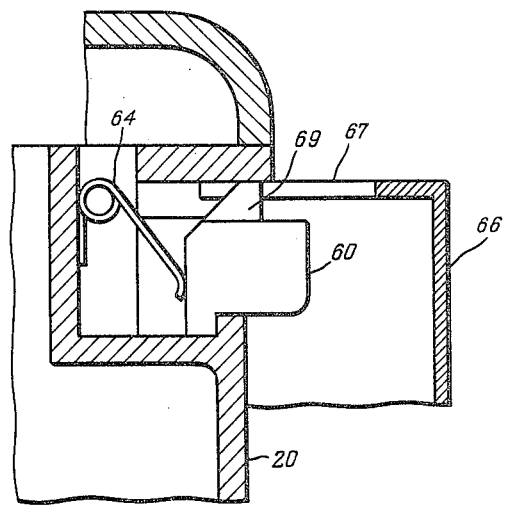
FIGS. 5 and 6 are partial vertical sectional views of a second embodiment of the camera with the back door in the open and closed positions, respectively.
Figure 6:
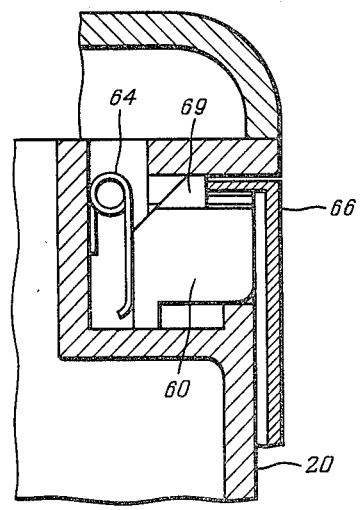

In FIGS. 5 and 6 there is shown a second embodiment of the film saving apparatus in which a stop member 60 slidable within housing 20, is urged into the film path directly by a torsion spring 64. Upon closing rear door member 66 a rim 67 formed on the door member contacts a tab portion 69 on the stop member 60 causing the stop member to slide in a direction to overcome the action of spring 64 until the stop member is out of the film path. At this time the door member 66 is closed and the camera is ready for picture taking as previously described above.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed is:

1. Film saving apparatus for a photographic camera of the type for use with roll film having a lead end with a tongue portion extending from a notched portion thereof comprising:
    a housing,
    a take-up spool disposed in said housing,
    means for supplying film having a tongue portion extending from a notched portion at the leader end of the film along a predetermined path onto said take-up spool,
    stop means positioned in the film path at right angles thereto and having a length across the film path that is insufficient to block the tongue portion of the film but which will block the notched portion of the film, said stop means being moveable from a first position in the film path to block the film at the notched portion thereof to a second position out of the film path permitting the film to be advanced along its path onto said take-up spool, and
    actuating means to move said stop means from its first position in the film path blocking the advance of the film to a second position out of the film path permitting the film to advance along its path onto said take-up spool.

2. Apparatus according to claim 1, wherein said stop means includes a stop member connected to a lever member, said lever member being pivotable on an axis in the housing, and a spring member disposed within the housing contacting and normally urging said lever member to move said stop member into said first position.

3. Apparatus according to claim 2, wherein said actuating means includes a door member pivotably mounted on an axis in said housing and having a camming surface formed thereon for camming said lever member in a direction to overcome the action of said spring member upon closing said door member thereby moving said stop member into said second position.

4. Apparatus according to claim 1, wherein said housing includes chamber means at right angles to the film path for exposing the film.

5. Apparatus according to claim 4, wherein said chamber means includes multiple chambers formed in the camera housing for producing multiple exposures simultaneously on the film.

6. Apparatus according to claim 1, wherein said film has a width that is 35 mm.

7. Apparatus according to claim 1, wherein said stop means includes a stop member slidable within said housing and a spring member disposed within said housing contacting and normally urging said stop member into said first position.

8. Apparatus according to claim 7, wherein said actuating means includes a door member pivotally mounted on an axis in said housing and having a camming surface formed thereon for contacting said stop member upon closing said door member to cause said stop member to slide in a direction to overcome the action of said spring member thereby moving said stop member into said second position.

* * * * *